(12) United States Patent
Kim et al.

(10) Patent No.: US 10,486,974 B2
(45) Date of Patent: Nov. 26, 2019

(54) HOLLOW SPHERICAL LITHIUM-TRANSITION METAL-SILICATE COMPOSITES, PREPARATION METHOD THEREOF, AND CATHODE ACTIVE MATERIAL FOR LITHIUM SECONDARY BATTERIES COMPRISING THE SAME

(71) Applicant: Korea Basic Science Institute, Daejeon (KR)

(72) Inventors: Yeon Ho Kim, Daejeon (KR); Hae Jin Kim, Daejeon (KR); Jin Bae Lee, Daejeon (KR); Won Gi Hong, Daejeon (KR); Sang Moon Lee, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 164 days.

(21) Appl. No.: 15/818,595

(22) Filed: Nov. 20, 2017

(65) Prior Publication Data

US 2018/0170762 A1 Jun. 21, 2018

(30) Foreign Application Priority Data

Dec. 16, 2016 (KR) ........................ 10-2016-0172955

(51) Int. Cl.
*C01B 33/32* (2006.01)
*H01M 4/136* (2010.01)
*H01M 4/58* (2010.01)

(52) U.S. Cl.
CPC ............. *C01B 33/32* (2013.01); *H01M 4/136* (2013.01); *H01M 4/5825* (2013.01); *C01P 2004/34* (2013.01); *C01P 2004/64* (2013.01)

(58) Field of Classification Search
None
See application file for complete search history.

(56) References Cited

FOREIGN PATENT DOCUMENTS

CN 103545510 A * 1/2014
JP 2012-195134 A 10/2012
(Continued)

OTHER PUBLICATIONS

Liu et al., "Yolk/shell nanoparticles: new platforms for nanoreactors, drug delivery and lithium-ion batteries", Chem. Commun., vol. 47, 2011, pp. 12578-12591.

*Primary Examiner* — Daniel S Gatewood
(74) *Attorney, Agent, or Firm* — Womble Bond Dickinson (US) LLP

(57) ABSTRACT

The present disclosure relates to a lithium-transition metal-silicate complex that is formed into a sphere with a hollow, in which a radius of the hollow is in a range of 0.5 to 3.0 nm, and a diameter of the lithium-transition metal-silicate complex is in a range of 5 to 10 nm. The present disclosure enables to facilitate the mass production of a complex including a lithium-transition metal-silicate complex, having a micro-sized hollow, and having a spherical shape.

In addition, when using a lithium-transition metal-silicate complex of the present disclosure as a cathode active material for a lithium secondary battery, it is capable of providing a cathode active material for a lithium-ion battery excellent in charging and discharging characteristics as well as in high-rate characteristics.

In addition, a lithium-transition metal-silicate complex manufactured according to the present disclosure may implement properties of materials of lithium, transition metal, and silicate as well as its structural characteristics, and thus, it can be effectively applied in various industrial fields.

17 Claims, 3 Drawing Sheets

(56) References Cited

FOREIGN PATENT DOCUMENTS

JP          2012195134 A  * 10/2012
KR   10-2009-0048964 A    5/2009

* cited by examiner

HOLLOW SPHERICAL LITHIUM-TRANSITION METAL-SILICATE COMPOSITES, PREPARATION METHOD THEREOF, AND CATHODE ACTIVE MATERIAL FOR LITHIUM SECONDARY BATTERIES COMPRISING THE SAME

CROSS-REFERENCE TO RELATED APPLICATIONS

This application claims the benefit under 35 U.S.C. 119(a) of Korean Patent Application No. 10-2016-0172955 filed on Dec. 16, 2016 in the Korean Intellectual Property Office, the entire disclosure of which is incorporated herein by reference for all purposes.

BACKGROUND

1. Field

The present disclosure relates to a lithium-transition metal-silicate complex, a method for manufacturing for the same, and a cathode active material including the lithium-transition metal-silicate complex.

2. Description of Related Art

A microporous sphere has a low density and a high specific surface area (area per unit volume), is capable of exchanging materials through micro pores, and is strong enough to withstand physical impact or pressure. Besides, in addition to the characteristics of the microporous sphere itself, it is possible to provide various characteristics depending on materials forming the microporous sphere.

At present, a microporous sphere of metal material, a micro hollow sphere of organic or nonorganic material, and so on have been known. Due to the properties of materials and microporous spheres, studies are being conducted to utilize it as hydrogen storage media, building materials, heat radiating materials, soundproof and electromagnetic shield materials, beauty materials, coating materials, filter materials, catalyst carriers, drug delivery materials, adsorbents for removing toxic substance, electrode materials of a fuel cell, and so on. Recently, studies are being actively carried out to apply it to high-tech industries.

Currently, most of the methods of producing a microporous sphere, as disclosed in Korean Patent Publication No. 2009-0048964, are conducted by a way of manufacturing a spherical template that can be dissolved in a specific solvent, covering the template with materials to be manufactured, and then removing the template inside the materials by using a solvent. In addition, there are methods known, for example, injecting gas and using the injected gas as a template. However, if a microporous sphere is formed by the above-described methods, there are some problems: it is difficult to form a very small sized hollow sphere; the thickness of a wall of a microporous sphere is relatively thicker; and the process conditions are complicated, so it is not appropriate for mass production.

In addition, the conventional methods are mostly for making production using a single-type material such as metal materials, organic materials, nonorganic materials, and so on, so there is a limit to apply the methods to the production of a microporous sphere of a complex, such as a metal material-nonorganic material complex.

SUMMARY

The present disclosure is introduced to solve the above-described problems and to provide a lithium-transition metal-silicate complex that enables to facilitate the mass production of a spherical lithium-transition metal-silicate complex which has a micro-sized hollow and whose wall thickness is thin.

The present disclosure is also introduced to provide a cathode active material excellent in charging and discharging characteristics as well as in high-rate characteristics.

The present disclosure is also introduced to provide a method for manufacturing a spherical lithium-transition metal-silicate complex with a hollow comprising a lithium-transition metal-silicate complex.

A lithium-transition metal-silicate complex according to the present disclosure is formed into a sphere with a hollow; a radius of the hollow is in a range of 0.5 to 3.0 nm; and a diameter of the lithium-transition metal-silicate complex is in a range of 5 to 10 nm.

Therein, the transition metal may include at least one selected from a group of manganese, cobalt, nickel, and titanium.

Therein, the transition metal may include manganese or cobalt.

Therein, the transition metal-silicate and the lithium are in a mole ratio of 1:1 to 1:16 in the complex.

Therein, the transition metal and the silicate are in a mole ratio of 1:1 to 1:10 in the complex.

A cathode active material for a secondary battery according to the present disclosure is formed into a sphere with a hollow; a radius of the hollow is in a range of 0.5 to 3.0 nm; and a diameter of the lithium-transition metal-silicate complex is in a range of 5 to 10 nm.

Therein, the transition metal may include at least one selected from a group of manganese, cobalt, nickel, and titanium.

Therein, the transition metal may include manganese or cobalt.

Therein, the transition metal-silicate and the lithium may be in a mole ratio of 1:1 to 1:16 in the complex.

Therein, the transition metal and the silicate may be in a mole ratio of 1:1 to 1:10 in the complex.

A method for manufacturing a lithium-transition metal-silicate complex according to the present disclosure includes: mixing and crushing a transition metal-silicate and a lithium precursor; and dissolving the crushed mixture in an organic solvent and conducting a hydrothermal reaction to obtain a lithium-transition metal-silicate complex being formed into a sphere with a hollow, in which a radius of the hollow is in a range of 0.5 to 3.0 nm, and a diameter of the lithium-transition metal-silicate complex is in a range of 5 to 10 nm.

Therein, the transition metal-silicate may be obtained by conducting: a first operation of adding the solvent to the transition metal precursor to prepare a solution including the transition metal and adding the solvent to a compound including silicon to prepare a solution including silicon; a second operation of reacting the solution including the transition metal and the solution including silicon prepared in the first operation at a temperature of 100 to 300° C. for 5 to 50 hours to form a transition metal silicate; and a third operation of heat treating the transition metal silicate formed via the second operation.

Therein, the transition metal precursor may be one selected from a group of $Mn(NO_3)_2 \cdot 4H_2O$, $Mn(CH_3CO_2)_2$, $Mn(CH_3CO_2)_2 \cdot 4H_2O$, $Mn(ClO_4)_2 \cdot 6H_2O$, $MnSO_4 \cdot xH_2O$, $MnSO_4 \cdot H_2O$, $Co(NO_3)_2 \cdot 4H_2O$, $Co(CH_3CO_2)_2$, $Co(CH_3CO_2)_2 \cdot 4H_2O$, $Co(ClO_4)_2 \cdot 6H_2O$, $CoSO_4 \cdot xH_2O$, $CoSO_4 \cdot H_2O$, $Ni(NO_3)_2 \cdot 4H_2O$, $Ni(CH_3CO_2)_2$, $Ni(CH_3CO_2)_2 \cdot 4H_2O$, $Ni(ClO_4)_2 \cdot 6H_2O$, $NiSO_4 \cdot xH_2O$, $NiSO_4 \cdot H_2O$, Ti(NO$_3$)$_2$.4H$_2$O, Ti(CH$_3$CO$_2$)$_2$, Ti(CH$_3$CO$_2$)$_2$.4H$_2$O, Ti(ClO$_4$)$_2$.6H$_2$O, TiSO$_4$.xH$_2$O, TiSO$_4$.H$_2$O, and a combination thereof, and the compound including silicon may be one selected from a group of Na$_2$SiO$_3$, SiCl$_4$, Si(OCOCH$_3$)$_4$, SiI$_4$, SiF$_4$, SiC$_{32}$H$_8$O$_2$, SiC$_{48}$H$_{26}$N$_8$O$_2$, SiC$_{32}$H$_{18}$N$_2$O$_2$, and a combination thereof.

Therein, the transition metal precursor and the compound including silicon may be reacted in a mole ratio of 1:1 to 1:10.

Therein, the dissolving operation may use ultrasonic waves, and the hydrothermal reaction may be conducted at 150 to 240° C. for 10 to 40 hours.

Therein, the transition metal-silicate and the lithium precursor may be mixed in a mole ratio of 1:1 to 1:16.

Therein, the lithium precursor may include at least one selected from a group of lithium chloride, lithium acetate, and lithium hydroxide.

According to the present disclosure, it is capable of facilitating the mass production of a spherical lithium-transition metal-silicate complex with a micro-sized hollow and whose thickness of wall is thin.

In addition, if a lithium-transition metal-silicate complex according to the present disclosure is used for a cathode active material for a lithium secondary battery, it is capable of providing a cathode active material excellent in charging and discharging characteristics as well as in high-rate characteristics.

In addition, a lithium-transition metal-silicate complex that is manufactured according to the present disclosure is capable of implementing structural characteristics as well as material properties of lithium, transition metal, and silicate, so it can be efficiently applied in various industrial fields.

DETAILED DESCRIPTION

Figure 1:
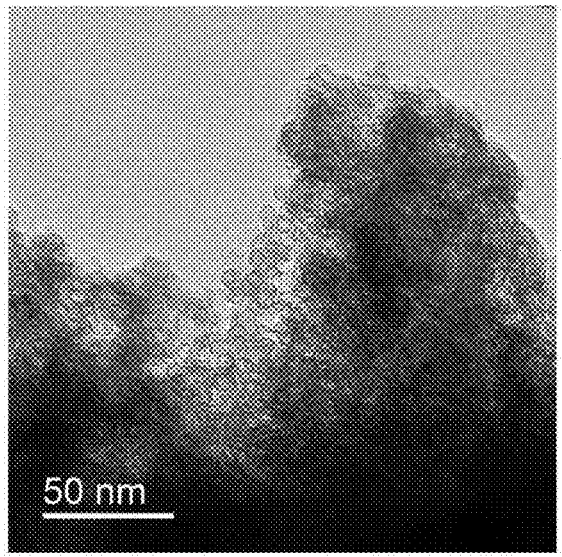
FIG. 1 is a Transmission Electron Microscopy (TEM) image of spherical manganese silicate with a hollow manufactured according to Example 1 of the present disclosure.
Figure 1:
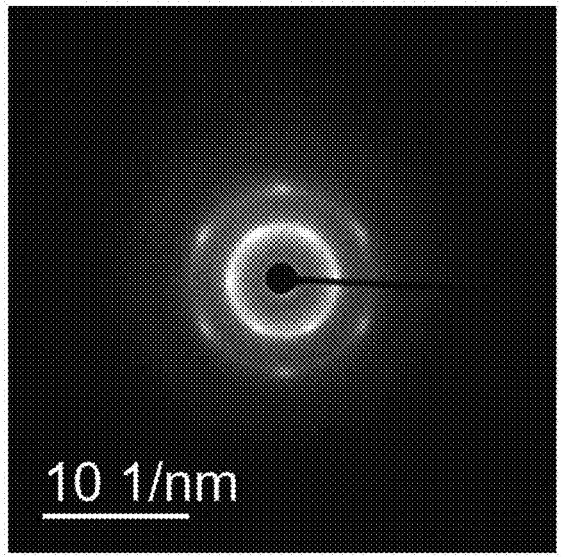

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In addition, preferred methods and samples are described in this specification, but similar or equivalent ones are included in the scope of the present disclosure. The contents of all publications, which are incorporated herein by reference, are incorporated herein by reference.

Throughout this specification, the terms "comprises" and "comprising", when not explicitly required in the context, include a stated step or element, or group of steps or elements, but it should be understood that any other step or element, or group of steps or elements, is not excluded.

Hereinafter, the present disclosure will be further described with reference to examples according to the present invention.

The present disclosure is suggested to provide a lithium-transition metal-silicate complex that enables to facilitate the mass production of a spherical lithium-transition metal-silicate complex having a micro-sized hollow and a thin wall thickness.

The present disclosure is also suggested to provide a cathode active material excellent in charging and discharging characteristics as well as in high-rate characteristics.

The present disclosure is also suggested to provide a method for manufacturing a spherical lithium-transition metal-silicate complex with a hollow made of complex materials of lithium, transition metal, and silicate.

In this specification, the spherical shape with a hollow is hereinafter referred to as "hollow sphere."

Recently, due to the properties of materials and microporous sphere, studies on applying a complex having a microporous sphere made of metal material to a high-tech industrial field are actively proceeding. However, there are some problems: the manufacturing process is complicated; it is difficult to manufacture a very small sized hollow sphere; the thickness of a wall of hollow sphere is relatively thicker; and the process conditions are complicated, so it is not appropriate for mass production.

The present disclosure is for solving those problems and provides a lithium-transition metal-silicate complex with a microporous sphere that enables to perform a simple manufacturing process and to facilitate mass production thereof.

A lithium-transition metal-silicate complex according to the present disclosure is formed into a sphere with a hollow; a radius of the hollow is in a range of 0.5 to 3.0 nm; and a diameter of the lithium-transition metal-silicate complex is in a range of 5 to 10 nm. If the radius of the hollow is less than 0.5 nm and the diameter of the lithium-transition metal-silicate complex is greater than 8 nm, the thickness of a wall of hollow sphere gets thicker, so the reduction will take a very long time; there is a high probability that a residual pore appears inside the particle; or it is hard to expect to be lightweight.

As the radius of hollow is larger and the diameter of lithium-transition metal-silicate complex is smaller, a specific surface area is larger and the volume of pore is larger.

A radius of the hollow may be less than 3 nm, and the diameter of lithium-transition metal-silicate complex may be greater than 5 nm. The radius of the hollow may be in a range of 50 to 60% of the diameter of lithium-transition metal-silicate complex.

To make the radius of the hollow of the lithium-transition metal-silicate complex larger and make the diameter of the lithium-transition metal-silicate complex smaller has a shortcoming that crushing should be conducted for a long time. Thus, regarding the radius of the hollow of the lithium-transition metal-silicate complex and the diameter of the lithium-transition metal-silicate complex, the above range is preferable in order to be commercially used.

If a hollow is formed in a lithium-transition metal-silicate complex according to the present disclosure, the complex may be used as a storage with an empty inside space helpful for various purposes, and the complex may have a light-weight, high-intensity material property, and high specific surface area, so it may be used for various purposes, for example, electrochemical materials such as an electrode of a lithium secondary battery, medium catalysts for water treatment or air cleaning, absolvents, chromatography fillers, drug delivery materials, and so on.

The lithium-transition metal-silicate complex satisfying the above numerical range is strong against a physical shock or pressure.

In particular, according to the present disclosure, it is capable of stably conduct mass production of a lithium-transition metal-silicate complex that has a very small particle and has a thin-wall hollow sphere.

The transition metal may include at least one selected from a group of manganese, cobalt, nickel, and titanium, and more preferably, either of manganese and cobalt, but not limited thereto.

The transition metal may be variously selected depending on properties desired to be applied to a microporous sphere. Among the various transition metals, the titanium has advantages in that it has an excellent ion mobility capability and there is no reduction in capacity even during a quick charge, but it has a shortcoming of high price; and the nickel has advantages of excellent penetration ability, electrochromic property, low driving voltage, and quick response, etc., but it has shortcomings in that it is not completely oxidized or reduced, leading to a narrower range of electrochromism, and particularly, uncomplete reduction results in being not colorless and transparent.

Manganese is more preferable in that it is eco-friendly compared to other transition metals, its price is relatively cheaper, and it has a high energy density, thereby, it may be efficiently applied in various fields. In addition, cobalt may be efficiently applied in that it has an excellent cycle property and all properties of materials are superior.

The transition metal-silicate and the lithium of the complex according to the present disclosure may be in a mole ratio of 1:1 to 1:16. If the mole ratio of lithium is less than 1, it is not preferable due to the low yield. If the mole ratio of lithium is greater than 16, it is not preferable in terms of finance. Thus, the above range is preferable.

In addition, the transition metal and the silicate according to the present disclosure are in a mole ratio of 1:1 to 1:10. If the mole ratio of silicate is less than 1, it is not preferable due to the low yield. If the mole ratio of silicate is greater than 10, it is not preferable in terms of finance because the cost of production unnecessarily increases. Thus, the above range is preferable.

The lithium-transition metal-silicate complex according to the present disclosure is used as a cathode active material for a lithium-ion battery excellent in charging and discharging characteristics as well as in high-rate characteristics.

Hereinafter, a method for manufacturing a spherical lithium-transition metal-silicate complex with a hollow is described.

In detail, a method for manufacturing a lithium-transition metal-silicate complex with a hollow according to an example of the present disclosure includes mixing and crushing a transition metal-silicate and a lithium precursor; and dissolving the crushed mixture in an organic solvent and conducting a hydrothermal reaction to obtain a lithium-transition metal-silicate complex being formed into a sphere with a hollow, in which a radius of the hollow is in a range of 0.5 to 3.0 nm and a diameter of the lithium-transition metal-silicate complex is in a range of 5 to 10 nm.

If the radius of the hollow is less than 0.5 nm and the diameter of the lithium-transition metal-silicate complex is greater than 8 nm, the thickness of a wall of hollow sphere gets thicker the reduction will take a very long time; there is a high probability that a residual pore appears inside the particle; or it is hard to expect to be lightweight.

As the radius of hollow is larger and the diameter of lithium-transition metal-silicate complex is smaller, a specific surface area is larger and the volume of pore is larger.

A radius of the hollow may be less than 3 nm, and the diameter of lithium-transition metal-silicate complex may be greater than 5 nm. The radius of the hollow may be in a range of 50 to 60% of the diameter of lithium-transition metal-silicate complex.

To make the radius of the hollow of the lithium-transition metal-silicate complex larger and make the diameter of the lithium-transition metal-silicate complex smaller has a shortcoming that crushing should be conducted for a long time. Thus, regarding the radius of the hollow of the lithium-transition metal-silicate complex and the diameter of the lithium-transition metal-silicate complex, the above range is preferable in order to be commercially used.

In addition, the transition metal silicate may be obtained by conducting: a first operation of adding the solvent to the transition metal precursor to prepare a solution including the transition metal and adding the solvent to a compound including silicon to prepare a solution including silicon; a second operation of reacting the solution including the transition metal and the solution including silicon prepared in the first operation at a temperature of 100 to 300° C. for 5 to 50 hours to form a transition metal silicate; and a third operation of heat treating the transition metal silicate formed via the second operation.

The transition metal precursor may be variously selected depending on properties desired to be applied to a microporous sphere, and any of matters known as transition metal precursors may be used. The transition metal precursor may be selected from a group of $Mn(NO_3)_2 \cdot 4H_2O$, $Mn(CH_3CO_2)_2$, $Mn(CH_3CO_2)_2 \cdot 4H_2O$, $Mn(ClO_4)_2 \cdot 6H_2O$, $MnSO_4 \cdot xH_2O$, $MnSO_4 \cdot H_2O$, $Co(NO_3)_2 \cdot 4H_2O$, $Co(CH_3CO_2)_2$, $Co(CH_3CO_2)_2 \cdot 4H_2O$, $Co(ClO_4)_2 \cdot 6H_2O$, $CoSO_4 \cdot xH_2O$, $CoSO_4 \cdot H_2O$, $Ni(NO_3)_2 \cdot 4H_2O$, $Ni(CH_3CO_2)_2$, $Ni(CH_3CO_2)_2 \cdot 4H_2O$, $Ni(ClO_4)_2 \cdot 6H_2O$, $NiSO_4 \cdot xH_2O$, $NiSO_4 \cdot H_2O$, $Ti(NO_3)_2 \cdot 4H_2O$, $Ti(CH_3CO_2)_2$, $Ti(CH_3CO_2)_2 \cdot 4H_2O$, $Ti(ClO_4)_2 \cdot 6H_2O$, $TiSO_4 \cdot xH_2O$, $TiSO_4 \cdot H_2O$, and a combination thereof, but not limited thereto.

Manganese is eco-friendly compared to other transition metals, its price is relatively cheaper, and it has a high energy density, thereby, it may be efficiently applied in various fields. Thus, it is more preferable to use a manganese precursor as the transition metal precursor.

In addition, cobalt has advantages in that it has an excellent cycle property and all properties of materials are superior.

Regarding the compound including silicon, any of compounds including silicon may be used. As an example, the compound including silicon may be one selected from $Na_2SiO_3$, $SiCl_4$, $Si(OCOCH_3)_4$, $SiI_4$, $SiF_4$, $SiC_{32}H_8O_2$, $SiC_{48}H_{26}N_8O_2$, $SiC_{32}H_{18}N_2O_2$, and a combination thereof, but not limited thereto.

Regarding the organic solvent used in the first operation, any solvent that can dissolve a transition metal precursor and compound including silicon may be used.

For example, ethanol, acetone, isopropyl alcohol, methanol, N-methylpyrolidone, tetrahydrofuran, decane, and a combination thereof may be used as the organic solvent, but not limited thereto. In addition, water may also be used as the solvent.

It is preferable that alcohol is used for the organic solvent from the organic solvents used in the first operation. Ethanol may be used among the alcohol. That is because, as a result of conducting experiment by variously selecting organic solvent dissolving the transition metal precursor in the final process, a more reliable result was obtained when alcohol, in particular, ethanol, is used as an organic solvent, compared to other organic solvents. Meanwhile, it was also capable of producing a microporous sphere with the use of other organic solvents. Thus, regarding the organic solvent dissolving a transition metal precursor is not limited to alcohol, in particular, to ethanol.

In the second operation, when the solution including transition metal prepared in the first operation and the solution including silicon are reacted each other, a transition metal-silicate with a microporous sphere is manufactured. In detail, in the second operation, if the solution including transition metal and the solution including silicon are reacted in a specific range of temperature and in a specific range of time, two solutions are reacted to form a transition metal-silicate, and as the reaction proceeds, the transition metal-silicate is rolled to be a shape of hollow sphere, and thus, the transition metal-silicate forms a microporous sphere. That is, after the formation of the transition metal-silicate, if the reaction is kept proceeding, the formed transition metal-silicate is rolled due to the differences in material properties between the transition metal and silicate. If the reaction is kept proceeding, the transition metal-silicate is formed into a hollow sphere. The transition metal-silicate formed in the current operation is in a shape of hollow sphere, but it is not in a completely stable state. It will be completely stable by a heat treatment described below.

At this time, it is preferable that the reaction is conducted at a temperature of 100 to 300° C. for 5 to 50 hours. If the reaction temperature and reaction time are less than a minimum limit, there is a concern that the transition metal-silicate may not be sufficiently formed and that the transition metal-silicate may not be formed into a spherical shape, and thus, it is not preferable. If the reaction temperature and reaction time are greater than a maximum limit, there is a concern that the hollow sphere formed while the transition metal-silicate is dried may have a shape other than a sphere shape which is broken or distorted, and thus, is not preferable.

The transition metal precursor and the compound including silicon may be reacted in a mole ratio of 1:1 to 1:10. If the mole ratio of compound including silicon is less than 1, it is not preferable due to the low yield. If the mole ratio of compound including silicon is greater than 10, it is not preferable in terms of finance because the cost of production unnecessarily increases. Thus, the above range is preferable.

That is in order to increase the yield of transition metal-silicate, and any transition metal precursor or compound including silicon that are not reacted may be removed via washing.

The washing may remove unreacted transition metal precursor or compound including silicon by washing with distilled water and ethanol three times, separately, by using a decompressor.

The reason for performing the depression filtration is that a lot of compound can be washed and a more complete washing is possible.

The transition metal-silicate formed via the second operation may go through not only washing but also drying. The drying is carried out at a temperature of 40 to 80° C. for 5 to 10 hours in a vacuum atmosphere.

Next, the transition metal-silicate may go through heat treatment via the third operation, and a completely stabilized hollow sphere may be formed by the heat treatment.

It is preferable that the heat treatment is performed in a vacuum atmosphere. If the heat treatment is not performed in a vacuum atmosphere, for example, if the heat treatment is performed in an air atmosphere, there is a concern that a part of the micro-sized hollows to be manufactured may be converted into a microporous sphere of transition metal oxide, which is not preferable. That is, if the heat treatment is performed in an air atmosphere, a part of the hollow sphere of the transition metal silicate is changed into the transition metal oxide hollow sphere, and the microporous sphere of the transition metal-silicate and the microporous sphere of transition metal oxide are simultaneously formed. Therefore, the yield of hollow sphere of transition metal-silicate may be lowered, which is not preferable. If the heat treatment is performed in a vacuum atmosphere instead of an air atmosphere, the hollow sphere of the transition metal-silicate is not changed into the hollow sphere of the transition metal oxide, and the microporous sphere of the stabilized transition metal-silicate can be obtained, and thus, the yield can be increased.

It is preferable that the heat treatment is performed at a temperature of 300 to 500° C. for 1 to 10 hours. If the heat treatment temperature and time are less than the minimum limit, the microporous sphere of the formed transition metal silicate is not sufficiently stabilized. If the heat treatment temperature and time are greater than the maximum limit, the microporous sphere of the transition metal silicate may be broken or the structure may be deformed, which is not preferable.

The operation of mixing and crushing the transition metal silicate and the lithium precursor may be carried out by any method as long as they can be mixed and crushed. The lithium precursor may at least one selected from the group consisting of lithium chloride, lithium acetate, and lithium hydroxide.

More preferably, lithium hydroxide is used as the lithium precursor. That is because, as a result of conducting experiment by variously selecting lithium precursors in the operation of mixing and crushing the transition metal-silicate and the lithium precursor, a more reliable result was obtained when lithium hydroxide is used as a lithium precursor, compared to other lithium precursors.

The transition metal-silicate and the lithium of the complex according to the present disclosure may be mixed and reacted in a mole ratio of 1:1 to 1:16. If the mole ratio of lithium precursor is less than 1, it is not preferable due to the low yield. If the mole ratio of lithium precursor is greater than 16, it is not preferable in terms of finance because the cost of production unnecessarily increases. Thus, the above range is preferable.

The unreacted transition metal silicate or lithium precursor may be removed by washing.

Next, the operation of dissolving the crushed mixture in an organic solvent and conducting a hydrothermal reaction to obtain a lithium-transition metal-silicate complex being formed into a sphere with a hollow is included. A radius of the hollow is in a range of 0.5 to 3.0 nm, and a diameter of the lithium-transition metal-silicate complex is in a range of 5 to 10 nm.

Regarding the organic solvent dissolving the crushed mixture, it is most preferably to use ethylene glycol, but it is not limited thereto, and any organic solvent capable of dissolving the crushed mixture may be used. Therein, it is preferable that the hydrothermal reaction is performed at a temperature of 150 to 240° C. for 10 to 40 hours. If the reaction temperature and reaction time are less than a minimum limit, the transition metal silicate and the lithium precursor do not sufficiently react with each other and a sufficient yield may not be obtained, which is not preferable. If the reaction temperature and reaction time are greater than a maximum limit, the transition metal silicate and the lithium precursor react with each other to cause the hollow sphere to break or crumble, and may have other shapes than a spherical shape, which is not preferable.

EXAMPLES

Hereinafter, the present disclosure will be described in more detail with reference to examples.

Example 1

Manufacturing a Lithium Manganese Silicate Complex, being Formed into a Sphere with a Hollow 0.52 g of Mn $(NO_3)_2$ was dissolved in 25 ml of ethanol to prepare a solution containing manganese. Further, 12.2 g of the compound $Na_2SiO_3$ containing silicon was dissolved in 200 ml of distilled water to prepare a 0.5 M silicon-containing solution.

Reacting the solution containing manganese and 5 ml of the solution containing silicon at 185° C. for 48 hours to prepare manganese silicate ($MnSiO_3$).

Next, the prepared manganese silicate ($MnSiO_3$) was washed three times with distilled water and ethanol using a vacuum filtration apparatus, dried at 50° C. for 5 hours in a vacuum atmosphere, and heat treated at 400° C. for 2 hours in a vacuum atmosphere to obtain stabilized manganese silicate ($MnSiO_3$) was prepared.

Next, the prepared manganese silicate ($MnSiO_3$) was mixed with lithium hydroxide (LiOH), which is a lithium precursor, at a mole ratio of 1:5 and then crushed together. Then, 0.1 g of the crushed mixture was dissolved in 30 mL of ethylene glycol using ultrasonic waves.

Finally, a stabilized lithium manganese silicate complex was prepared by hydrothermal reaction at 185° C. for 36 hours.

Example 2

Manufacturing a Lithium Cobalt Silicate Complex being Formed into a Sphere with a Hollow A lithium cobalt silicate complex was prepared in the same manner as in Example 1 except for executing the operation that 0.52 g of Co$(NO_3)_2$ was dissolved in 25 ml of ethanol to prepare a solution containing cobalt instead of executing the operation that 0.52 g of Mn$(NO_3)_2$ was dissolved in 25 ml of ethanol to prepare a solution containing manganese.

Comparative Example

The same procedure as in Example 1 was carried out except that lithium hydroxide (LiOH), which is a lithium precursor, was mixed and reacted in the preparation of manganese silicate (MnSiO3).

0.52 g of Mn$(NO_3)_2$ was dissolved in 25 ml of ethanol to prepare a solution containing manganese. Further, 12.2 g of the compound $NA_2SiO_3$ containing silicon was dissolved in 200 ml of distilled water to prepare a 0.5 M solution containing silicon.

The solution containing manganese, the solution containing silicon, and 40 g of lithium hydroxide (LiOH) were reacted at 185° C. for 48 hours to prepare lithium manganese silicate.

Characteristic Evaluation

FIG. 1 is a Transmission Electron Microscopy (TEM) image of spherical manganese silicate with a hollow manufactured according to Example 1 of the present disclosure. As illustrated in FIG. 1, it was confirmed that the manganese silicate with a microporous sphere had a size of about 5 to 8 nm and had a uniform hollow sphere shape.

Figure 2:
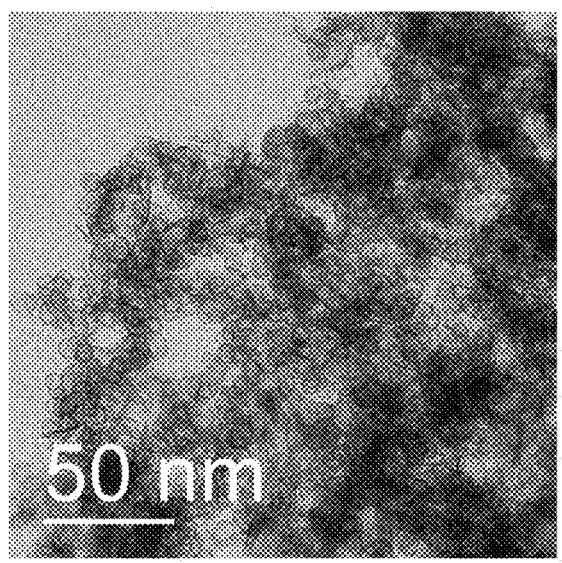
FIG. 2 is a TEM image of spherical lithium manganese silicate with a hollow manufactured according to Example 1 of the present disclosure.
Figure 2:
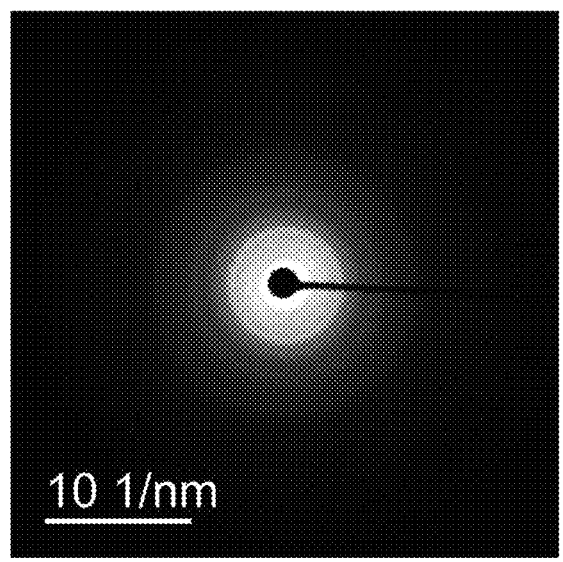

FIG. 2 is a TEM image of spherical lithium manganese silicate with a hollow manufactured according to Example 1 of the present disclosure. As illustrated in FIG. 2, it was confirmed that the manganese silicate microsphere prepared according to the examples of the present disclosure had a size of about 5 to 8 nm and had a uniform hollow sphere shape.

Figure 3:
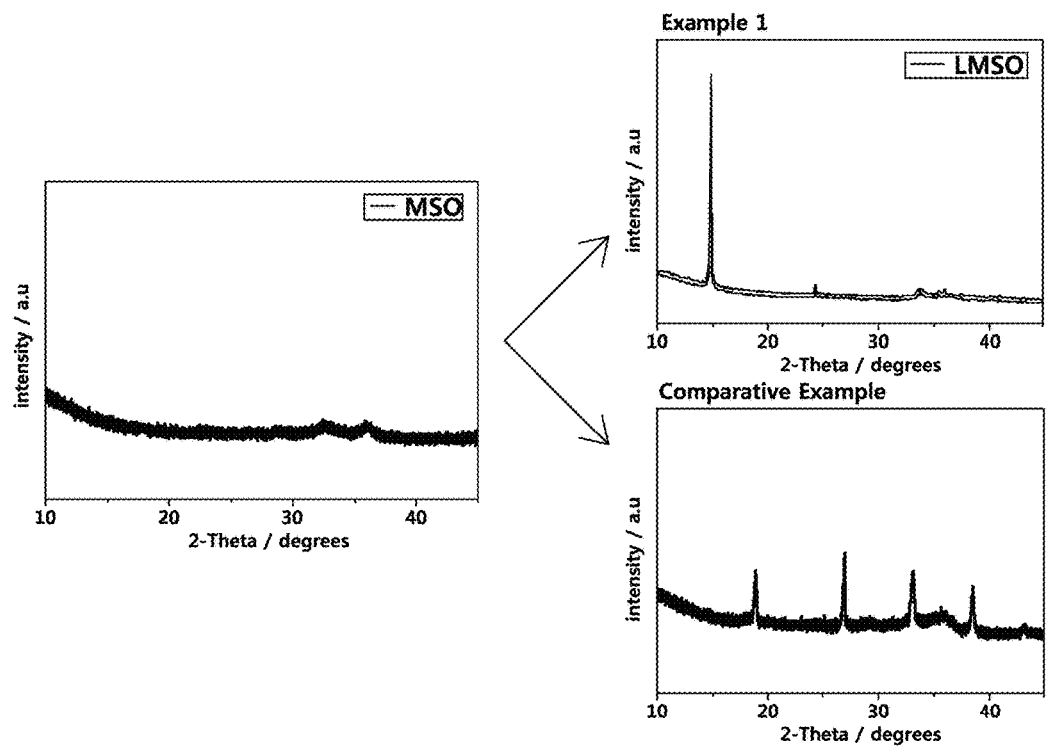
FIG. 3 shows X-Ray Diffraction (XRD) data of spherical lithium manganese silicate with a hollow according to Example 1 and Comparative Example of the present disclosure.

FIG. 3 shows X-Ray Diffraction (XRD) data of spherical lithium manganese silicate with a hollow according to Example 1 and Comparative Example of the present disclosure. As illustrated in FIG. 3, it was confirmed that the lithium manganese silicate prepared according to Example 1 of the present disclosure was a lithium manganese silicate complex in which a microporous sphere is manufactured. On the other hand, it was confirmed that the lithium manganese silicate prepared according to Comparative Example was not a lithium manganese silicate complex.

Figure 4:
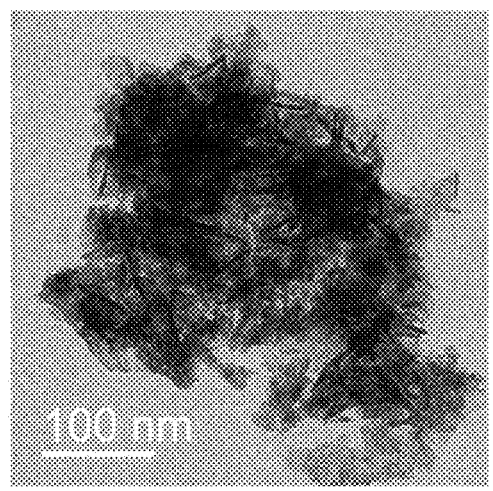
FIG. 4 is a TEM image of lithium-transition metal-silicate manufactured according to Comparative Example 1.

FIG. 4 is a TEM image of lithium-transition metal-silicate manufactured according to Comparative Example 1. As illustrated in FIG. 4, it was confirmed that the lithium manganese silicate according to Comparative Example 1 did not have the shape of the hollow sphere.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims. Accordingly, the scope of the present disclosure shall be determined only according to the attached claims.

What is claimed is:
1. A lithium-transition metal-silicate complex,
   wherein the complex is formed into a sphere with a hollow,
   wherein a radius of the hollow is in a range of 0.5 to 3.0 nm, and
   wherein a diameter of the lithium-transition metal-silicate complex is in a range of 5 to 10 nm.

2. The lithium-transition metal-silicate complex of claim 1,
wherein a transition metal of the lithium-transition metal-silicate complex comprises at least one selected from a group of manganese, cobalt, nickel, and titanium.

3. The lithium-transition metal-silicate complex of claim 2,
wherein the transition metal comprises manganese or cobalt.

4. The lithium-transition metal-silicate complex of claim 1,
wherein a transition metal-silicate and a lithium of the lithium-transition metal-silicate complex are in a mole ratio of 1:1 to 1:16 in the complex.

5. The lithium-transition metal-silicate complex of claim 4,
wherein a transition metal and a silicate of the lithium-transition metal-silicate complex are in a mole ratio of 1:1 to 1:10 in the complex.

6. A cathode active material for a secondary battery, comprising a lithium-transition metal-silicate complex,
wherein the lithium-transition metal-silicate complex is formed into a sphere with a hollow,
wherein a radius of the hollow is in a range of 0.5 to 3.0 nm, and
wherein a diameter of the lithium-transition metal-silicate complex is in a range of 5 to 10 nm.

7. The cathode active material for the secondary battery of claim 6,
wherein a transition metal of the lithium-transition metal-silicate complex comprises at least one selected from a group of manganese, cobalt, nickel, and titanium.

8. The cathode active material for the secondary battery of claim 7,
wherein the transition metal comprises manganese or cobalt.

9. The cathode active material for the secondary battery of claim 6,
wherein a transition metal-silicate and a lithium of the lithium-transition metal-silicate complex are in a mole ratio of 1:1 to 1:16 in the complex.

10. The cathode active material for the secondary battery of claim 6,
wherein a transition metal and a silicate of the lithium-transition metal-silicate complex are in a mole ratio of 1:1 to 1:10 in the complex.

11. A method for manufacturing a lithium-transition metal-silicate complex, comprising:
mixing and crushing a transition metal-silicate and a lithium precursor into a crushed mixture; and
dissolving the crushed mixture in an organic solvent and conducting a hydrothermal reaction to obtain a lithium-transition metal-silicate complex being formed into a sphere with a hollow,
wherein a radius of the hollow is in a range of 0.5 to 3.0 nm, and
wherein a diameter of the lithium-transition metal-silicate complex is in a range of 5 to 10 nm.

12. The method for manufacturing the lithium-transition metal-silicate complex of claim 11,
wherein the transition metal-silicate is obtained by conducting:
a first operation of adding the organic solvent to a transition metal precursor to prepare a solution including a transition metal and adding the organic solvent to a compound including silicon to prepare a solution including silicon;
a second operation of reacting the solution including the transition metal and the solution including silicon prepared in the first operation at a temperature of 100 to 300° C. for 5 to 50 hours to form a transition metal silicate; and
a third operation of heat treating the transition metal silicate formed via the second operation.

13. The method for manufacturing the lithium-transition metal-silicate complex of claim 12, wherein the transition metal precursor is one selected from a group of $Mn(NO_3)_2 \cdot 4H_2O$, $Mn(CH_3CO_2)_2$, $Mn(CH_3CO_2)_2 \cdot 4H_2O$, $Mn(ClO_4)_2 \cdot 6H_2O$, $MnSO_4 \cdot xH_2O$, $MnSO_4 \cdot H_2O$, $Co(NO_3)_2 \cdot 4H_2O$, $Co(CH_3CO_2)_2$, $Co(CH_3CO_2)_2 \cdot 4H_2O$, $Co(ClO_4)_2 \cdot 6H_2O$, $CoSO_4 \cdot xH_2O$, $CoSO_4 \cdot H_2O$, $Ni(NO_3)_2 \cdot 4H_2O$, $Ni(CH_3CO_2)_2$, $Ni(CH_3CO_2)_2 \cdot 4H_2O$, $Ni(ClO_4)_2 \cdot 6H_2O$, $NiSO_4 \cdot xH_2O$, $NiSO_4 \cdot H_2O$, $Ti(NO_3)_2 \cdot 4H_2O$, $Ti(CH_3CO_2)_2$, $Ti(CH_3CO_2)_2 \cdot 4H_2O$, $Ti(ClO_4)_2 \cdot 6H_2O$, $TiSO_4 \cdot xH_2O$, $TiSO_4 \cdot H_2O$, and a combination thereof, and
wherein the compound including silicon is one selected from a group of $Na_2SiO_3$, $SiCl_4$, $Si(OCOCH_3)_4$, $SiI_4$, $SiF_4$, $SiC_{32}H_8O_2$, $SiC_{48}H_{26}N_8O_2$, $SiC_{32}H_{18}N_2O_2$, and a combination thereof.

14. The method for manufacturing the lithium-transition metal-silicate complex of claim 12, wherein the transition metal precursor and the compound including silicon are reacted in a mole ratio of 1:1 to 1:10.

15. The method for manufacturing the lithium-transition metal-silicate complex of claim 11,
wherein the dissolving uses ultrasonic waves, and
wherein the hydrothermal reaction is conducted at 150 to 240° C. for 10 to 40 hours.

16. The method for manufacturing the lithium-transition metal-silicate complex of claim 11,
wherein the transition metal-silicate and the lithium precursor are mixed in a mole ratio of 1:1 to 1:16.

17. The method for manufacturing the lithium-transition metal-silicate complex of claim 11,
wherein the lithium precursor includes at least one selected from a group of lithium chloride, lithium acetate, and lithium hydroxide.

* * * * *